United States Patent [19]

Seely

[11] Patent Number: 4,575,040

[45] Date of Patent: * Mar. 11, 1986

[54] DEFLECTABLE SIGN AND STAND

[75] Inventor: James R. Seely, Rochester, Mich.

[73] Assignee: Marketing Displays, Inc., Farmington Hills, Mich.

[ * ] Notice: The portion of the term of this patent subsequent to Oct. 1, 2002 has been disclaimed.

[21] Appl. No.: 751,562

[22] Filed: Jul. 3, 1985

Related U.S. Application Data

[60] Division of Ser. No. 497,815, May 25, 1983, Pat. No. 4,572,473, which is a continuation-in-part of Ser. No. 442,378, Nov. 17, 1982, abandoned.

[51] Int. Cl.⁴ ..................... F16M 13/00

[52] U.S. Cl. ..................... 248/624; 40/602; 40/608; 248/354.5

[58] Field of Search ............... 248/160, 170, 166, 161, 248/624, 407, 599-601, 354.5, 121-125; 40/606-608, 602, 611, 612; 292/219, 228; 403/108, 109, 330, 395, 398, 399

[56] References Cited

U.S. PATENT DOCUMENTS

| | | | |
|---|---|---|---|
| 1,420,268 | 6/1922 | Hodny . | |
| 1,764,071 | 6/1930 | Foulke . | |
| 1,854,478 | 4/1932 | Meyers . | |
| 1,972,959 | 9/1934 | Taylor . | |
| 2,167,564 | 7/1939 | Fonda | 248/407 X |
| 2,172,282 | 9/1939 | Hopp . | |
| 2,592,386 | 4/1952 | Breakey . | |
| 2,719,688 | 10/1955 | Seifert | 248/188.5 |
| 2,815,594 | 12/1957 | Heselov . | |
| 2,847,776 | 8/1958 | Robertson . | |
| 2,849,202 | 8/1958 | McCombs . | |
| 3,164,354 | 1/1965 | Murdock . | |
| 3,171,179 | 3/1965 | Lee . | |
| 3,256,594 | 6/1966 | Howard et al. . | |
| 3,287,840 | 11/1966 | Keats | 40/607 X |
| 3,310,901 | 3/1967 | Sarkisian . | |
| 3,384,348 | 5/1968 | Wicker . | |
| 3,458,945 | 8/1969 | Edwards . | |
| 3,521,390 | 7/1970 | Carlson . | |
| 3,526,200 | 9/1970 | Doyle | 40/606 X |
| 3,535,807 | 10/1970 | Baldwin . | |
| 3,620,496 | 11/1971 | Boh et al. . | |
| 3,646,696 | 3/1972 | Sarkisian . | |
| 3,662,482 | 5/1972 | Sarkisian . | |
| 3,683,527 | 8/1972 | Gilman . | |
| 3,899,843 | 8/1975 | Doyle et al. | 40/612 X |
| 3,910,614 | 10/1975 | Coe | 292/219 |
| 4,033,536 | 7/1977 | Hillstrom . | |
| 4,265,040 | 5/1981 | Sarkisian . | |
| 4,288,053 | 9/1981 | Sarkisian . | |
| 4,368,586 | 1/1983 | Furzelias . | |
| 4,433,935 | 2/1984 | Main et al. | 248/125 X |

FOREIGN PATENT DOCUMENTS

| | | | |
|---|---|---|---|
| 0078520 | 5/1983 | European Pat. Off. . | |
| 1269369 | 5/1968 | Fed. Rep. of Germany | 248/121 |
| 768730 | 2/1934 | France | 40/607 |
| 1289175 | 5/1961 | France | 403/108 |
| 1286852 | 1/1962 | France . | |
| 72532 | 9/1947 | Norway . | |
| 323967 | 1/1930 | United Kingdom . | |
| 790068 | 2/1958 | United Kingdom . | |
| 865044 | 4/1961 | United Kingdom . | |
| 1117283 | 6/1968 | United Kingdom . | |
| 1133297 | 11/1968 | United Kingdom . | |
| 1267932 | 3/1972 | United Kingdom . | |
| 1299642 | 12/1972 | United Kingdom . | |
| 1311582 | 3/1973 | United Kingdom . | |
| 1404624 | 3/1975 | United Kingdom . | |
| 2023694 | 1/1980 | United Kingdom . | |
| 2056738 | 3/1981 | United Kingdom . | |
| 1601142 | 10/1981 | United Kingdom . | |

*Primary Examiner*—J. Franklin Foss
*Assistant Examiner*—David L. Talbott
*Attorney, Agent, or Firm*—Harness, Dickey & Pierce

[57] ABSTRACT

An improved sign and sign stand assembly is disclosed wherein the sign stand includes means for mounting the sign on a frame member of the stand. The frame membr includes means for permitting the sign to laterally pivot or swing under side-wind loads in order to allow a resilient portion of the frame member to deflect generally along a predetermined plane, thereby substantially preventing the sign and stand assembly from tipping over. Means are also provided for displaying warning flags or other warning devices on said sign and stand assembly without restricting or impeding such laterally pivoting or swinging of the sign.

6 Claims, 12 Drawing Figures

FIG. 7.
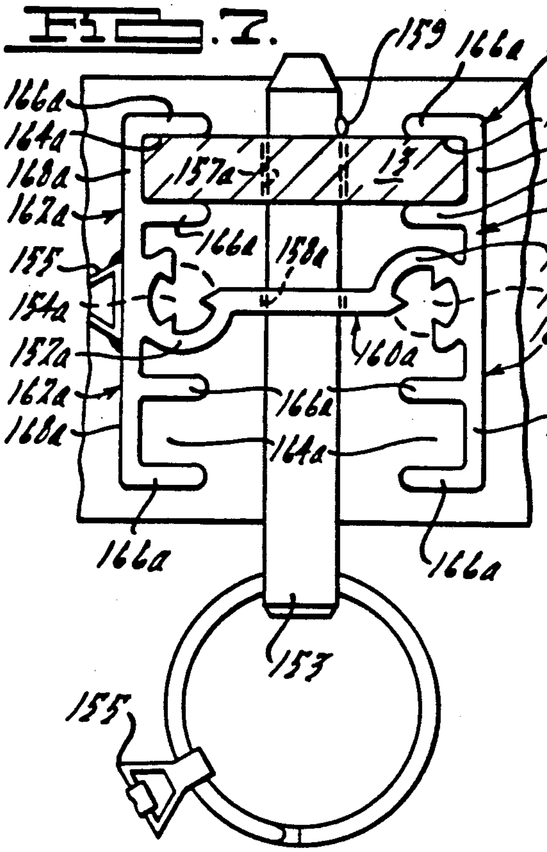
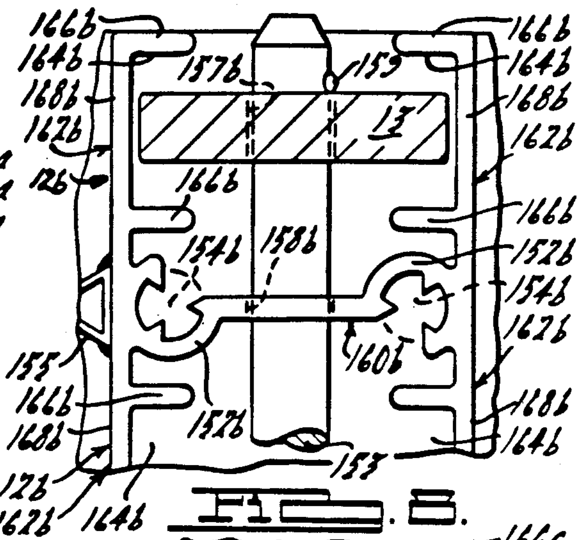
FIG. 8.
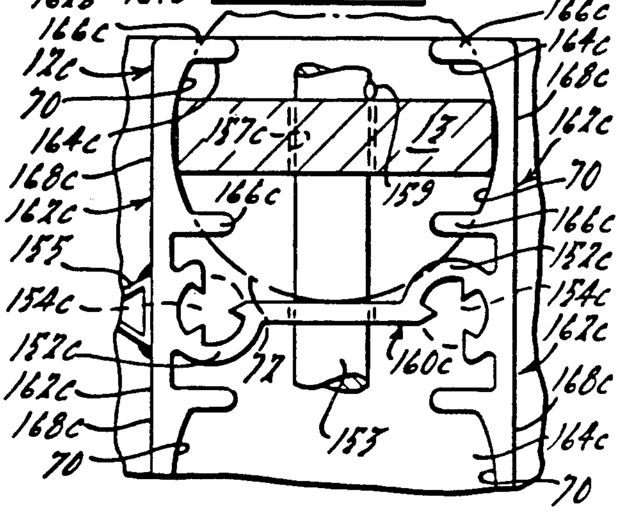
FIG. 9.
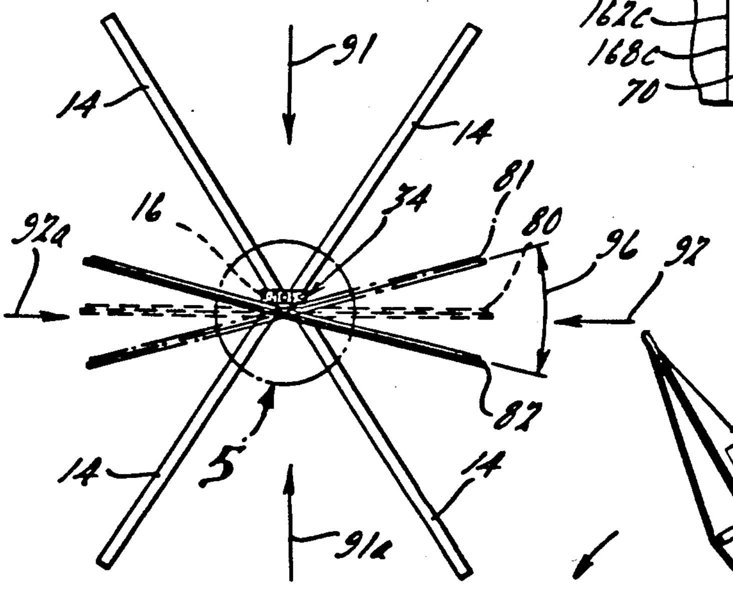
FIG. 10.
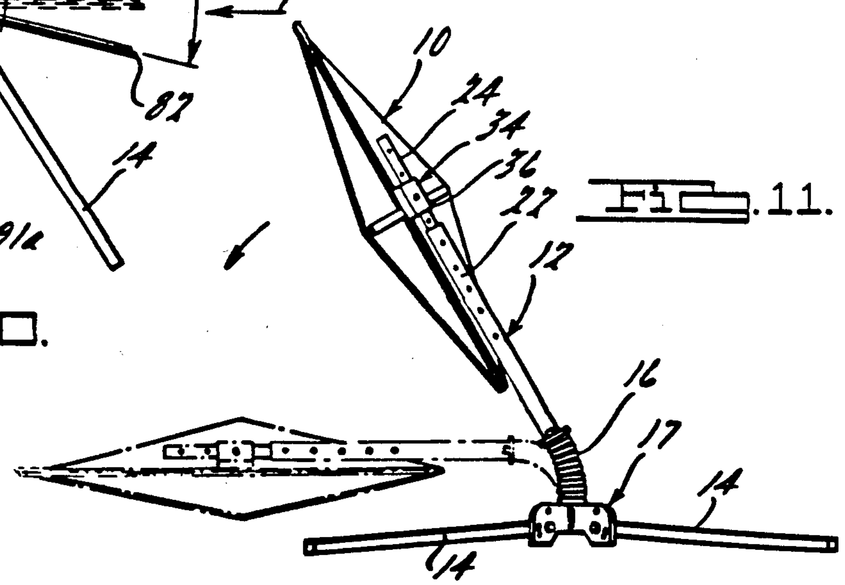
FIG. 11.

DEFLECTABLE SIGN AND STAND

This is a division of application Ser. No. 497,815, filed May 25, 1983, now U.S. Pat. No. 4,572,473, which was a continuation-in-part of application Ser. No. 442,378 filed Nov. 17, 1982 now abandoned.

BACKGROUND AND SUMMARY OF THE INVENTION

The present invention relates to sign and sign stand devices for signs and display devices of all kinds. The invention more particularly relates to means for securing holding roll-up and flexible signs in place without tipping over in high winds.

Numerous sign stands and poster display devices known today are used for displaying various signs and messages for conveying advertisements and information to the public. On construction sites, for example, such signs are typically positioned on sign standards that are either anchored in the ground, held in place by sandbags or other heavy objects, or spring-mounted on bases which allow them to bend or deflect generally along a predetermined plane, without tipping over, under high wind forces. Spring-mounted sign stands which can be used for this purpose are shown in U.S. Pat. Nos. 3,646,696; 3,662,482; 4,033,536; 4,265,040; and 4,288,053; as well as in copending patent applications, Ser. No. 274,400, filed June 17, 1981; 442,418, filed Nov. 17, 1982, and 442,419, filed Nov. 17, 1982. All of said copending applications are assigned to the same assignee as the invention herein, and their disclosures are hereby incorporated by reference herein. Such deflectable sign stands, although unanchored and lightweight, prevent tipping over or sliding of the units in virtually all weather and wind conditions.

Signs commonly used at construction sites are square, rectangular or diamond in shape, flat in configuration, made of metal or wood, and have pertinent informative or warning messages or symbols on them. The wood and metal signs are bulky and heavy, causing numerous problems in storage, transporation and mounting, and to overcome these problems, flexible roll-up type signs are being used more and more frequently today. These flexible signs are also typically square, rectangular to diamond-shaped signs but are made out of a heavy-duty flexible and foldable material, such as vinyl, or reinforced cloth or plastic. Such signs are lighter and thus easier to handle than metal or wood signs and are also typically adapted to be rolled-up or folded-up for ease of transportation and storage.

The flexible or roll-up signs have one disadvantage when used with unanchored resiliently-mounted sign stands. Although such signs work very satisfactorily when the wind forces are directed generally transversely to the plane of the sign, the flexible signs have a tendency to make the unanchored sign stands unstable when the wind forces are exerted in directions generally parallel to the plane of the sign.

The above-discussed roll-up signs typically have one or more relatively rigid cross-braces to hold them in their fully extended configurations, with brackets or other mounting means on sign stands for holding the signs in place. The cross-braces are elongated members, typically made of wood, fiberglass or a similar strong material, and are connected to one another in the middle so that they can be rotated together for storage. Examples of brackets used for mounting roll-up signs on sign stands are found in U.S. Pat. No. 4,288,053; as well as in the above-mentioned copending patent application, Ser. No. 274,400, filed June 17, 1981, which is assigned to the same assignee as the invention herein. Some of the brackets presently in use for mounting roll-up signs, however, are often difficult and time-consuming to operate, are difficult to accurately position on the standard, and may not prevent the sign from coming off under severe weather conditions. For emergency use, it is often necessary that signs bearing warnings or emergency instructions be adapted to set up and made operational with as little difficulty and as quickly as possible.

It is an object of the present invention to provide an improved sign and sign stand device having improved means for holding and securing the sign on an upright or pole-type frame member of the sign stand. It is a further object to provide an improved sign bracket which overcomes the potential instability problems previously experienced in side-direct winds with existing flexible roll-up signs. A further object is to provide a sign that has the particular capability of quick and easy mounting or attachment of such roll-up or other flexible-type signs on the frame member of the sign stand. A still further object is to provide a sign stand which securely holds a roll-up type sign in place regardless of the orientation of the sign stand, regardless of wind conditions, and regardless of wind direction.

In accordance with the present invention a sign stand preferably has an upstanding frame member that is resiliently deflectable relative to a ground-engaging base along a predetermined plane in response to wind forces directed generally transverse to the plane of the sign. The sign attachment mechanisms of the various embodiments of invention are preferably adapted to permit or cause the sign to pivot or swing laterally about a generally vertical axis in response to side-wind forces directed generally parallel to the plane of the sign. Such pivotal movement of the sign to be oriented generally transverse to the sign and permits or causes the frame member to deflect generally along the above-mentioned predetermined plane, thereby preventing the sign stand from tipping over. The various alternate sign attachment mechanisms of the present invention are also particularly adapted to prevent the sign from becoming detached from the frame member during such lateral pivotal movement of the sign. Also, the various alternate sign stands of the present invention have the particular capability of quick and easy mounting or attachment of a roll-up or other flexible sign on the frame member of the sign stand. Preferably, the vertical cross-brace members are also adapted to be capable of supporting a flag holder or other such supporting device, thereby allowing construction flags or other warning devices to be displayed thereon.

Other objects, features and advantages of the present invention will become apparent from the following description and claims taken in conjunction with the accompanying drawings.

BRIEF DESCRIPTION OF THE DRAWINGS

FIG. 7 is a cross-sectional view taken along the plane of section line 7—7 of FIG. 6.

FIG. 8 is a cross-sectional view similar to that of FIG. 7, but illustrating another embodiment of the sign and stand construction of FIG. 6.

FIG. 9 is a cross-sectional view similar to that of FIG. 7, but illustrating still another embodiment of the sign and stand construction of FIG. 6.

FIG. 10 is a top view of the sign and stand assembly of the present invention, shown with the vertical cross-brace broken away, and illustrating the lateral pivotal or swinging movement of the sign.

FIG. 11 is a side view of the sign and stand assembly of the present invention, shown with the vertical cross-brace broken away, and illustrating the frame member in a partially downwardly-deflected position.

DETAILED DESCRIPTION OF THE PREFERRED EMBODIMENTS

Figure 1:
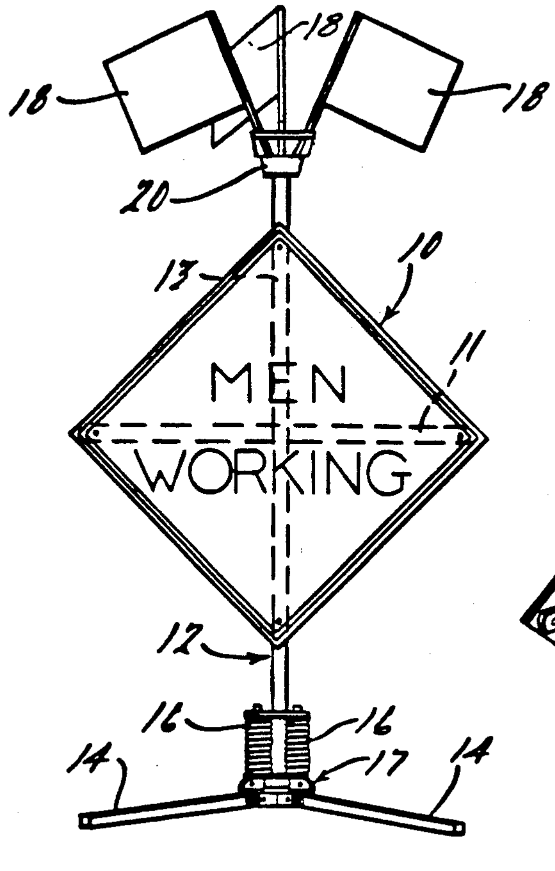
FIG. 1 is a front view of a construction-type sign stand.

The drawings show merely exemplary embodiments of the present invention for purposes of illustration only. One skilled in the art will readily recognize that the principles of the invention are well-adapted for application to devices other than sign and stand assemblies as well as to sign and stand assemblies other than those shown in the drawings.

FIGS. 1 through 5 show an inventive sign attachment bracket in use on a construction sign, with the construction sign 10 mounted on an upright sign frame or pole 12. The frame 12 is supported on the ground preferably by a plurality of ground-engaging legs 14 and a pair of coil springs 16 which allow the sign 10 and frame 12 to deflect relative to the base assembly 17 in a downward direction when subjected to wind forces and then resiliently return to their normal upright position shown in FIG. 1. Spring-mounted sign stands which can be used for this purpose are disclosed in the above-mentioned U.S. Pat. Nos. 3,646,696; 3,662,082; 4,033,536; 4,265,040; and 4,288,053; and in the above-mentioned copending applications, which are assigned to the same assignee as the invention herein. It is understood, of course, that the mounting bracket of FIGS. 1 through 5 may also be used with other types of sign stands or frame members, whether permanently anchored or portable.

The top of the frame 12 may optionally include a plurality of warning flags 18 held in place by a flag holder bracket 20. As is commonly known in the construction industry, the flags 18 are used as a high-level warning for approaching traffic.

Figure 6A:
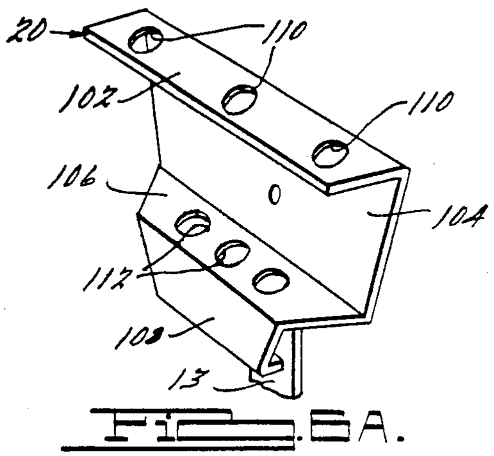
FIG. 6A is a perspective view of a flag holder device and upper portion of the vertical cross-brace of the sign and stand in FIG. 6.
Figure 6:
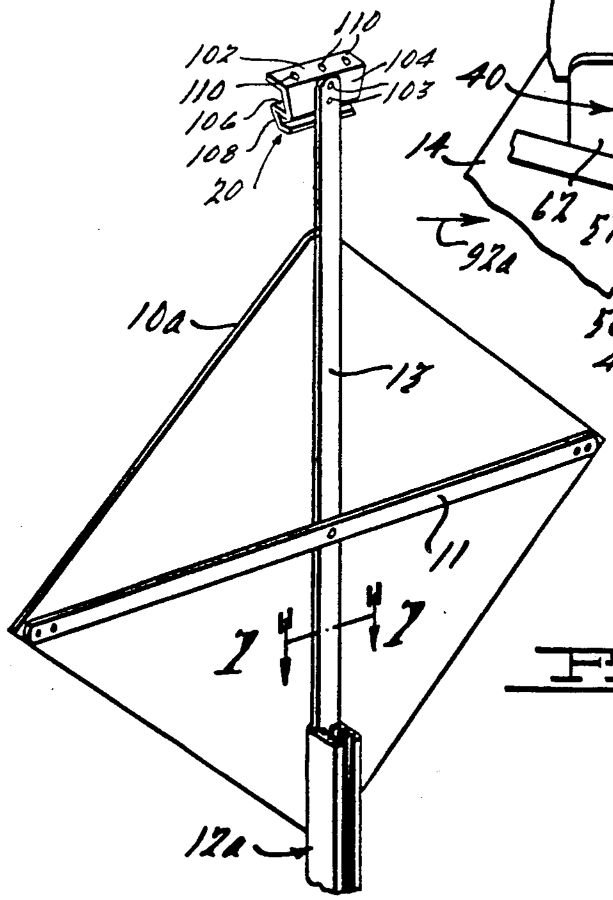
FIG. 6 is a partial rear perspective view similar to FIG. 2, but depicting a sign and stand device with the construction flags, removed and having an alternate construction according to the present invention.

The flag holder bracket 20, which is also shown in FIGS. 6 and 6A, preferably includes an upper horizontal portion 102, a vertical portion 104, an intermediate horizontal portion 106 vertically spaced from the upper horizontal portion 102 and an angulated lower portion 108. The flag holder bracket 20 is secured to the vertical cross-brace 13 by means of conventional fasteners 103 extending through mounting holes in the vertical portion 104 and through the vertical cross-brace.

The poles of the flags 18 are releasably inserted through a number of openings 110 in the upper horizontal portion 102 of the flag holder, and through a corresponding number of openings 112 in the intermediate horizontal portion, and abut the lower portion 108. The openings 112 are preferably spaced more closely to one another than are the openings 110 so that the flags diverge, thereby avoiding interference with one another and increasing their visability. It should be noted that the flage holder 20 may be employed in conjunction with any of the embodiments of the invention described herein. One skilled in the art will readily recognize that other alternate flag holder configurations may be used in lieu of the preferred flag holder 20 shown for purposes of illustration in the drawings.

Figure 2:
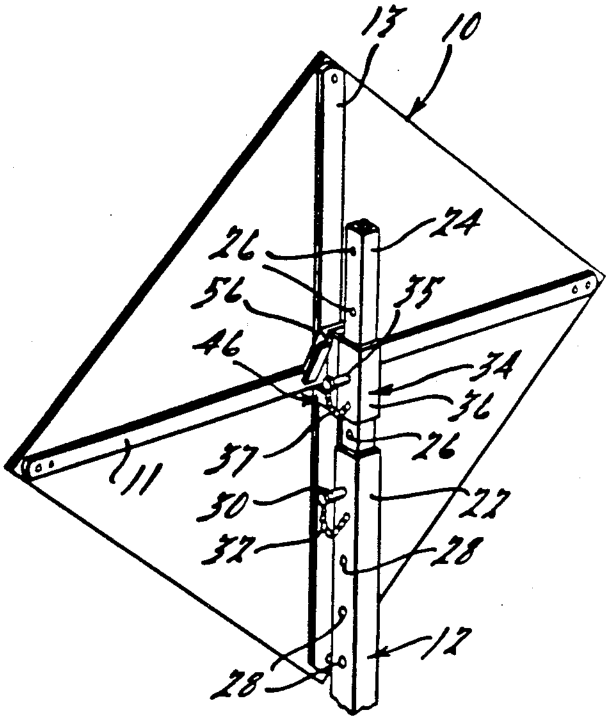
FIG. 2 is a partial rear perspective view of the construction sign shown in FIG. 1, depicting an embodiment of the invention having an adjustable sign bracket assembly.
Figure 3:
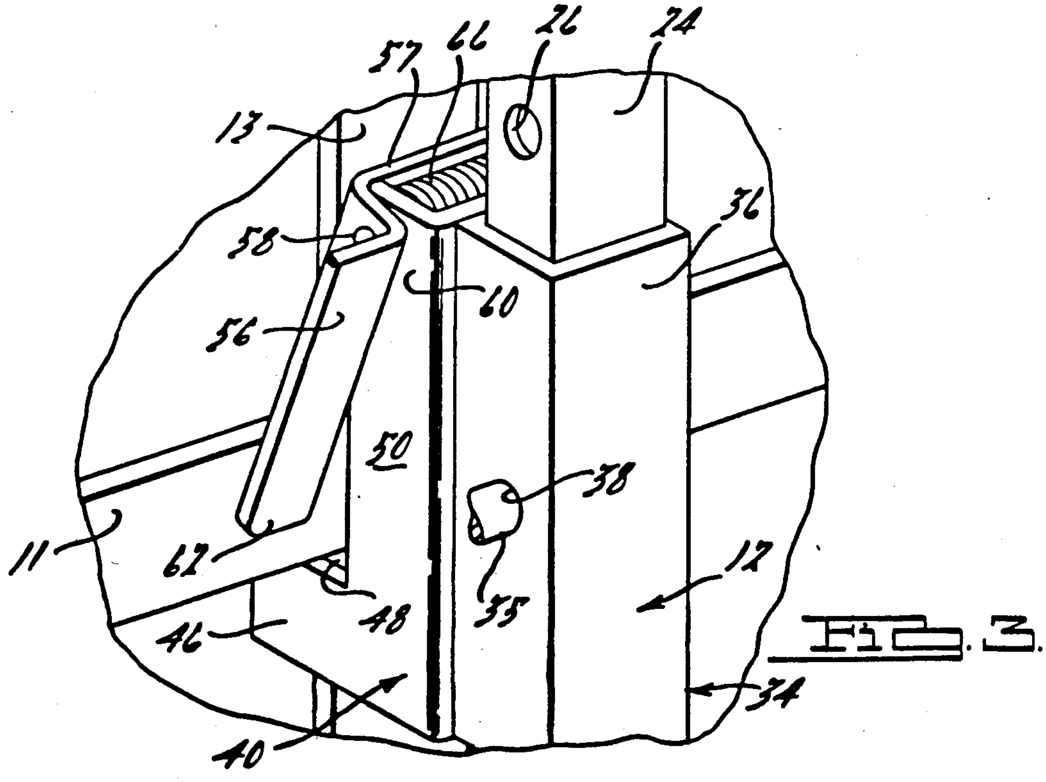
FIG. 3 is an enlarged rear view, with the portions cut away, of the sign bracket portion of FIG. 2.

As shown in FIGS. 2 and 3, the frame 12 may optionally be telescopic and include two sections, a larger lower section 22 and a smaller upper section 24. The upper section 24 is adapted to slidably extend and retract inside the lower section 22 and has a plurality of holes 26 which align with corresponding holes 28 in the lower section 22 so that the sections can be held in place at the desired extended or retracted position by a pin 30 which is insertable through aligned pairs of holes 26 and 28. The pin 30 is attached to portion 22 of the frame 12 by a chain 32 or other similar retainer means so that the pin 30 will not be lost or misplaced when removed from the holes. Alternately, the frame 12 may have a one-piece construction (not shown), if the above-discussed telescopic feature is neither necessary nor desired.

The frame 12 may be composed of any conventional material which is sturdy enough to be used for the purpose described herein, but is preferably composed of a hollow metal construction, such as aluminum or steel. Hollow frames made from extruded aluminum material have provided very satisfactory performance. The cross-sectional shape of the frame 12 is preferably square (as shown in FIGS. 2 and 3), although it should be understood that the frame can have any suitable cross-sectional size and shape so long as it can be used as a stand for a construction sign or similar display.

The sign 10 has a large flexible and foldable sign panel with a warning, message or symbol on one side and a pair of cross-braces 11 and 13 pivotally attached to one another on the other side. The flexible sign panel is preferably composed of a heavy-duty material such as vinyl or reinforced cloth or plastic, for example. The cross-braces 11 and 13 are made of a relatively rigid material (such as fiberglass, metal or wood) and serve to brace and support the flexible sign panel in its fully extended position. As shown in FIGS. 2 and 3, one of the cross-braces 11 is pivoted to a horizontal position when the sign is mounted on the frame 12, while the other cross-brace 13 is vertically situated. Any of several attaching means known in the art may be used to retain the corners of the sign panel at the ends of the cross-brace 11 and 13 in order to erect the sign to its display configuration. At least cross-brace 13 should have a thickness such that it is strong enough to support the weight of the flag holder 20 and the flags 18 when the sign is erected.

When the sign 10 is removed from the frame member 12 and is to be taken down, at least two of the corners of the flexible sign panel material are detached from the ends of their corresponding cross-brace, and the cross-braces are pivoted to a generally parallel, mutually-aligned relationship. The flexible sign panel material, which remains attached to one of the cross-braces, may then be folded or rolled up around the mutually-aligned cross-braces for compact, convenient storage.

The sign 10 is held in place on the sign stand or frame 12 by an adjustable sign bracket 34. As shown in FIGS. 2 through 5, the bracket preferably includes a sleeve-type bracket mounting member 36 that is hollow and adapted to slidingly fit over the frame 12. The cross-sectional size and shape of the sleeve member 36 should preferably correspond to the cross-sectional size and shape of the frame 12.

The sleeve member 36 includes a pin 35 attached thereto by a chain 37 or other similar means to prevent the pin 35 from being lost or misplaced. The pin 35 may be inserted through an aligned pair of holes 38 in the sleeve member and through any of the various aligned holes 26 on the upper section of the frame 12 in order to selectively position the bracket 34 at the desired vertical height. It should be noted that the number and spacing of the holes 26 and 28 on the upper and lower sections of the frame 12 will, of course, depend upon the desired use of the sign stand.

Figure 4:
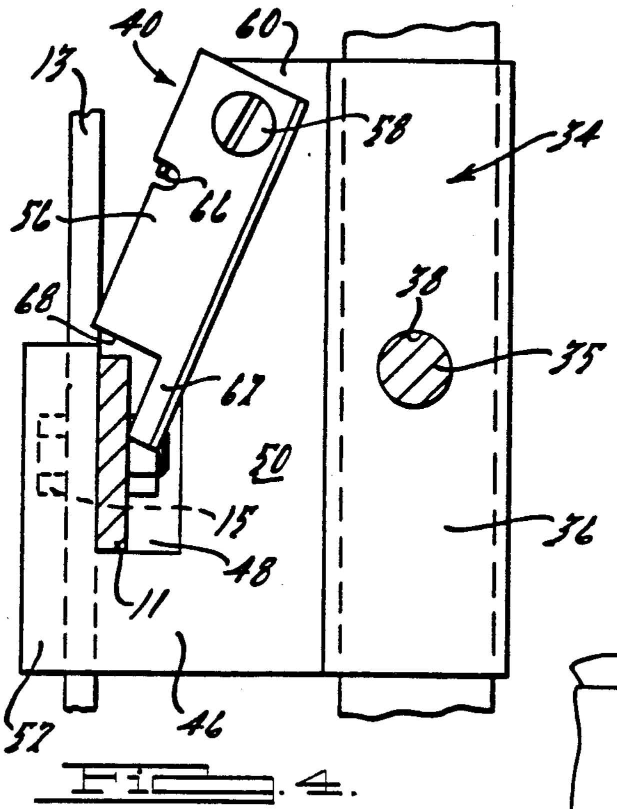
FIG. 4 is a side view of the sign bracket assembly of FIG. 2.
Figure 5:
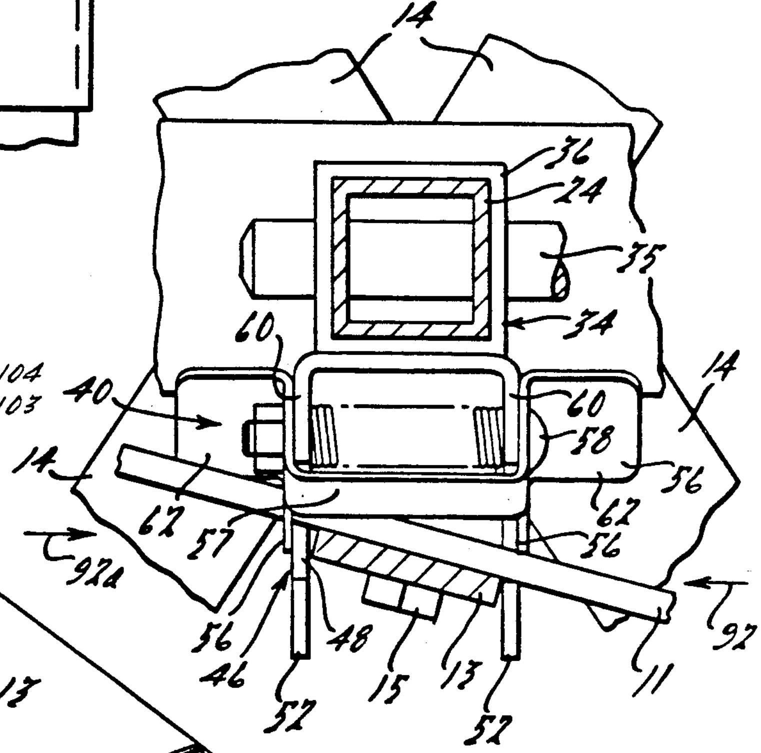
FIG. 5 is a top view of the sign bracket assembly of FIG. 2, illustrating the lateral pivotal movement of a cross-brace of the sign.

As is illustrated in FIGS. 3 through 5, the sign bracket 34 includes sign attachment means 40 fixedly secured to the sleeve member 36. The sign attachment means 40 preferably includes a pair of upwardly-presenting channel members 46 protruding in an outward direction from the sleeve member 36. Each of the channel members 46 includes an inner leg 50 spaced apart from an outer leg 52, with the inner and outer legs being interconnected by a base member 54. The channel spaces 48 in each of the channel members 46 are laterally aligned with each other such that the horizontal cross-brace 11 may be positioned in the channel spaces 48 in order to mount the sign on the sign bracket 34.

As shown in FIGS. 3 through 5, a pair of latching members 56 are preferably interconnected by a bridge portion 57 for pivotal movement with one another about a pivot pin 58 extending through apertures in the latching member and in an upper bracket portion 60. A biasing spring 66, which is preferably a torsion-type spring, surrounds the pivot pin 58 and includes end protuberances that engage the bridge portions 57 and the upper portion of the base member 54 to resiliently bias the latching members toward the outer legs 52 as shown in FIG. 4. An abutment portion 62 at the lower end of each of the latching members 56 cooperates with the biasing spring 66 to resiliently urge the horizontal cross-brace 11 against the outer legs 62 when the latching members 56 are in the closed position shown in FIG. 4. In such closed position, the latching members 56 and the channel members 46 at least partially circumscribe the horizontal cross-brace 11 to retain the cross-brace in the channel spaces 48. Although the above-described interconnected latching members are preferred, separate latching members may alternatively be employed.

It should be noted that when the latching members 56 are in their above-described closed position, as perhaps best shown in FIG. 5, the lower edges 68 of the latching members 56 are disposed above the upper edge of the cross-brace 11. By such a relationship, the latching members 56 prevent the cross-brace from being lifted or otherwise moving upwardly, under the influence of wind gusts, for example, and thus escaping from the channel spaces 48. As is shown in FIG. 5, this relationship between the cross-brace 11 and at least one of the latching members 56 is maintained even when the sign 10 pivots or swings laterally in response to side-directed wind loads, as described below and shown in FIG. 10.

The sign attachment means 40 of the sign bracket 34 also facilitates the quick and easy attachment and removal of the sign 10 from the sign stand assembly. In order to attach the sign to the sign bracket 34, the latching members 56 are pivoted inwardly toward the inner legs 50 against the force of the biasing spring 66. The cross-brace 11 is then merely inserted or positioned into the channel spaces 48 in the channel members 46. The latching members 56 are then released, and the latching members 56 pivot outwardly under the force of the biasing spring 66 to engage and circumscribe the cross-brace 11, as shown in FIG. 5, thereby retaining the cross-brace in the channel spaces 48. Alternatively, the cross-brace 11 may be urged in a generally inward and downward direction against the outer edges of the latching members 56 in order to forcibly pivot the latching members inwardly toward the inner legs 50 against the force of the biasing spring 66. The cross-brace 11 then slides downwardly along the outer edges of the latching members and into the channel spaces 48. Once the cross-brace passes below the lower edges 68 of the latching members, the latching members automatically pivot or "snap" outwardly under the force of the biasing spring 66 to engage and circumvent the cross-brace as shown in FIG. 5.

In order to remove the sign 10 from the sign bracket 34, the latching members 56 are manually pivoted inwardly against the force of the biasing spring 66, and the cross-brace 11 is merely lifted out from the channel spaces 48. Once the cross-brace 11, and thus the sign 10 have been removed from the frame 12, the latching members 56 may be released to be biasingly pivoted outwardly by the biasing spring 66.

When wind forces are exerted on a sign and stand assembly a torque is developed which tends to tip over the assembly. This wind torque equals the product of the wind force and the distance from the ground to the vertical center of the sign. Such wind torque is resisted by a so-called resistance torque, which is the product of the weight of the sign and stand assembly and the distance from the lateral center of the assembly to a tipping axis about which the assembly would rotate if tipping over under the influence of a given wind force. Such tipping axis in the embodiments of the invention described herein is generally a line intersecting the outward ends of the down-wind legs. Thus the sign and stand assembly would tip over if the wind torque tending to tip over the sign and stand assembly exceeds the resistance torque tending to maintain the sign and stand assembly in an upright position.

In order to prevent the sign and stand assembly of the present invention from tipping over in high winds, the assembly is provided with means for permitting the frame member to deflect downwardly in response to wind forces generally transverse to the plane of the sign as well as in response to wind forces generally parallel to the plane of the sign. By allowing the frame member to deflect downwardly, the height of the vertical center of the sign is reduced, thereby reducing the above-described wind force to a level less than that of the resistance torque of the sign and stand assembly.

Referring to FIGS. 5, 10 and 11, the coil springs 16 provide a resilient connection between the frame 12 and the base assembly 17 such that the frame 12 is resiliently deflectable generally along a predetermined plane, which is generally perpendicular to the plane of the sign when the sign is in its normal orientation 80 shown in FIG. 10. Such deflection occurs in response to the first wind forces that are exerted on the sign in a direction generally transverse to the plane of the sign panel, such as those illustrated by reference numerals 91 or 91*a*, for example. It should be understood, however, that such transversely-directed first wind forces need not be exerted in a direction perpendicular to the plane of the sign (when in its normal sign plane orientation 80) in order to cause such deflection of the coil springs 16. It is sufficient that such transversely-directed wind forces have enough of a force vector component in a direction perpendicular to the normal sign orientation 80 such that the coil springs 16 may be caused to deflect.

Spring mounted sign stands in accordance with the above-identified patents preferably have the ability to deflect to a point where the sign 10 is generally parallel to the ground (as shown in FIG. 11). In order to insure that the sign and stand assembly do not tip over in side-wind loading conditions, such as the second wind forces 92 or 92*a* exerted in a direction generally parallel to the normal sign plane orientation 80, the sign bracket 34 preferably includes means for allowing the sign to pivot or swing laterally about a generally vertical axis in response to such side-wind loads. Such capability allows the pivoted sign to assume sign orientations such as those illustrated by reference numerals 81 and 82 in FIG. 10.

In this embodiment, such means for allowing such lateral pivotal or swinging sign movement is provided by the channel spaces 48, which are sufficiently wider in the inner and outer directions than the cross-brace 11 to allow the cross-brace to pivot about a generally vertical axis as illustrated in FIGS. 5 and 11. As is discussed above and further shown in FIG. 5, the resilient biasing of the latching members 56 toward the outer legs 52 maintains at least one of the latching members in the above described circumscribing relationship with the cross-brace 11 during such pivoting the sign. The resilient biasing spring 66 is thus sufficiently stiff to maintain such relationship, but resiliently yieldable enough to allow such lateral pivotal or swinging movement of the cross-brace 11 and the panel of sign 10 in response to side-wind loads. It should also be noted that the biasing spring 66 cooperates with the latching members 56 to resiliently bias the cross-brace 11 against the outer legs 62, as described above, when the side-wind load is not sufficient to cause the sign to pivot. Thus the sign is maintained in a stable orientation generally perpendicular to approaching traffic during light-load or no-load wind conditions.

When sign 10 pivots or swings laterally about a generally vertical axis to a transverse orientation relative to side-directed winds, as discussed above, the second wind forces (such as 92 or 92*a*) have a force vector component exerted against the sign in a direction sufficiently transverse to the sign such that the coil springs 16 may resiliently deflect the frame 12 along the above-described predetermined plane as shown in FIG. 11. The biasing springs 66 and the coil springs 16 are selected with appropriate spring constants such that sufficient lateral pivotal movement of the sign occurs to cause or allow the resultant deflection of the frame member to occur before the sign and stand assembly can tip over under the second wind forces. Although the exact range of pivotal swinging movement of the sign depends upon several factors such as the sign size and weight and the spring constants, for example, a range of pivotal or swinging sign movement through a total arc 96 (as shown in FIG. 10) of approxmately 10–35 degrees, and preferably through an arc of approximately 15 degrees to either side of the normal sign plane orientation, has been found to provide satisfactory results. Either smaller or larger ranges of pivotal or swinging movement may also be sufficient to cause or allow the desired frame deflection depending upon the particular application of the principles of the invention.

As shown and described above, the sign bracket provides for simple, quick and easy attachment and removal of signs on frames of sign stands, as well as minimizing the possibility of a sign stand assembly with a roll-up sign tipping over in high winds from a side direction. The sign mounting bracket is preferably made of steel or aluminum, but can be made of any material which is strong enough to withstand the forces construction signs are normally exposed to in use. Although the bracket of this embodiment of the invention is described above as being used for flexible or roll-up type signs of diamond shape, it is apparent that the bracket can be used with a wide variety of signs of different materials, rigid or soft, and with signs of widely varying sizes and shapes. With rigid signs, a flange or protruding member at least functionally similar to the cross-brace 11 should be provided and should be adapted to fit within the channel spaces 48 on the bracket 34.

FIGS. 6 through 9 illustrate an alternate construction of the invention employed in a sign and stand adapted for use near an accident scene for providing a warning on on-coming motorists. A warning sign 10*a* is mounted or attached to a relatively short upright frame or pole 12*a*, and the frame 12*a* is supported on the ground by a plurality of ground-engaging legs (not shown). The pair of coil springs, similar to those shown in FIG. 1 discussed above, interconnect the frame 12*a* with a base assembly (not shown) and allow the sign 10*a* and frame 12*a* to deflect downwardly when subjected to wind forces and then to return to their normal upright positions.

The ground-engaging legs are preferably telescopic and are preferably pivotally attached to the base assembly in order to be extended and folded downwardly to a ground-engaging position generally perpendicular to the frame 12*a* or retracted and folded upwardly to a folded position generally adjacent and parallel to the frame 12*a*. It should be noted that the legs 14 of the embodiment discussed above in connection with FIGS. 1 through 5 may also optionally be telescopic and foldable similar to the legs of the embodiment of FIGS. 6 through 9.

The sign 10*a*, like the sign 10 discussed above, includes a large flexible panel with a warning message or symbol on one side and the above-discussed pair of cross-braces 11 and 13 pivotally attached to one another on the other side. The cross-braces 11 and 13 are made of a fiberglass or similar material, are relatively rigid in order to brace and support the flexible sign panel in its fully extended position, and yet are sufficiently flexible to be twisted to allow lateral movement of the sign as discussed hereinafter. As discussed above, the cross-brace 11 is situated in a horizontal position when the sign is mounted on the frame 12*a*, while the other cross-brace 13 is vertically situated and retained by the frame 12*a* as described below.

If the optional flag holder 20 and warning flags 18 are desired or required in connection with the embodiment illustrated in FIGS. 6 through 9, at least the cross-brace 13 should also be rigid enough to support the weight of the flag holder 20 and the warning flags 18, regardless of the wind conditions to which the sign and stand assembly is subjected. As mentioned above, however, the cross-brace 13 must also be sufficiently flexible to be twisted in order to allow lateral movement of the sign as discussed hereinafter.

In one sign and stand assembly actually constructed in accordance the embodiment of the invention shown in FIGS. 6 through 9, it was found that a cross-brace composed of an acrylic reinforced fiberglass and having thickness of approximately ⅜ inch provided the necessary rigidity to support the flag holder and flags, while still maintaining the required flexibility discussed below. In comparison, where the optional flag holder and flags were not required, this cross-brace, with thickness of approximately 3/16 inch, provided sufficient rigidity to brace and support the sign panel and possessed the flexibility required for the lateral sign movement discussed below. Accordingly, if the optional flag holder and flags are to be mounted on the sign and stand assembly, and such acrylic reinforced fiberglass composition is employed, at least the vertical cross-brace should preferably be in the range of approximately ¼ inch to approximately ½ inch. If, however, the flag holder and flags are not desired, such a cross-brace need only have a thickness in the range of approximately ⅛ inch to approximately ¼ inch.

As is illustrated in FIGS. 7 through 8, the frame 12*a* is preferably an extruded member having any of several predetermined cross sections described below. The frame may be composed of any conventional material that is sturdy enough to be used for the purposes described herein, but is preferably composed of a metal, such as light-weight extruded aluminum, for example. Frames made from such extruded aluminum material have provided very satisfactory performance.

The cross-sectional shape of the frame 12*a* as shown in FIG. 7, includes a central support member 160*a* and a pair of symmetrical flanges 162*a* protruding in opposite directions on each end of the central support member 160*a*. The outermost ends of the flange members 162*a* each include a generally U-shaped channel 164*a*. The channels 164*a* are identical, but symmetrically opposite, and are each formed by a pair of generally parallel channel legs 166*a* interconnected by a channel base 168*a*. Preferably, in the embodiment showing FIG. 7, the width of the space between the corresponding channel legs 166*a* is such that the vertical cross-brace 13 may be slidably and interferingly inserted into the pair of channels 164*a* on either of the opposite sides of the frame 12*a* in order to be frictionally attached and retained therein. Such a symmetrically opposite sign attachment configuration allows the warning sign 10*a* to be very quickly erected and attached to the frame 12*a* merely by frictionally inserting the vertical cross-brace 13 within the pair of channels 164*a* on either of the identical sides of the frame 12*a*. Therefore, no matter which of the opposite sides of the frame is oriented toward on-coming traffic when the stand is set-up, the user may quickly erect and display the warning sign without having to reorient the sign stand assembly. Of course, it is also possible to, if desired, provide a frame 12*a* with just one pair of channels 164*a* on only one side of the frame 12*a* in accordance with the present invention.

Referring to both FIGS. 6 and 7, it should be noted that only a relatively short portion of the lower end of the vertical cross-brace 13 is inserted into, and frictionally engaged by, the frame 12*a*. Thus enough of the cross-brace 13 is engaged by the frame 12*a* to securely mount the sign 10*a* thereon, but a relatively large vertical portion of the cross-brace 13 is left unsecured by the frame 12*a*. Such unsecured portion of the cross-brace 13 is sufficiently long that it may resiliently and torsionally twist under the influence of side-directed wind loads as is explained more fully later in this description.

Because of the relative short length of the cross-brace 13 that is frictionally secured to the frame 12*a*, a hitch pin 153*a* may optionally be attached to the frame 12*a* by a chain 155*a* for insertion through apertures 157*a* and 158*a* in the cross-brace 13 and the frame 12*a*, respectively. Although use of such a hitch pin may not be necessary in most instances to insure retention of the cross-brace in the frame member channels, it may be deemed desirable or necessary in particular applications of the invention. If included on frame 12*a*, however, the hitch pin 153*a* preferably includes a spring-loaded detent means 159*a* at its free end for substantially preventing the hitch pin from vibrating loose or otherwise slipping or working free from its engagement with the cross-brace 13 and the frame 12*a*. The hitch pin and its related apparatus are described in more detail below in connection with the discussion of FIG. 8.

Preferably, the frame 12*a* also includes a pair of base attachment receptacles 152*a* on at least one side of the central support member 160*a*. The base attachment receptacles 152*a* are preferably extruded integrally with the frame 12*a* and are adapted to receive fasteners 154*a* extending upwardly through an upper plate 156*a* for securing the frame 12*a* to the coil spring assembly discussed above. The fasteners 154*a* are preferably self-tapping screws that threadably and frictionally engage the sides of the base attachment receptacles 152*a* and are long enough to adequately support the frame 12*a*.

Like the embodiment of the invention described above in connection with FIGS. 1 through 5, the various embodiments shown in FIGS. 6 through 9 also provide means for substantially preventing the sign and stand from tipping over in high winds. In this regard, the pivoting and deflecting motion of such embodiments, to be described in detail below, are similar to that shown in FIGS. 10 and 11 for the embodiment of FIGS. 1 through 5. Therefore the embodiments of FIGS. 6 through 9 will also be described herein with reference to FIGS. 10 and 11 for purposes of convenience. It will be readily apparent from such description that the embodiments of FIGS. 6 through 9 also include means for reducing the wind torque on the sign and stand assembly to a level less than that of the assembly's resistance torque, as described above.

The coil springs on the frame 12*a* provide a resilient connection between the frame and the base assembly such that the frame 12*a* is resiliently deflectable generally along a predetermined plane, which is generally perpendicular to the plane of the sign 10*a* when the sign is in its normal orientation 80 as shown in FIG. 10. In use during high wind forces, the spring mounted sign stands in accordance with the above-mentioned patents and copending applications can deflect to a point where the plane of the sign is generally parallel to the ground. Regardless of the amount of deflection, the sign resiliently returns to its upright position when the wind forces subside.

In most cases during use, the deflection of the sign occurs in response to wind forces that are exerted on the sign in a direction generally transverse to the plane of the sign panel, such as those illustrated by reference numerals 91 or 91*a* in FIG. 10, for example. Thus, as is described above, it should be understood that such transversely-directed wind forces need not be exerted in a direction perpendicular to the plane of the sign when in its normal sign orientation 80 in order to cause such deflection of the coil springs. It is sufficient merely that such transversely-directed forces have enough of a force vector component in a direction perpendicular to the normal sign orientation 80 such that the coil springs may be caused to deflect.

In order to insure that the sign and stand assembly will remain stable in side-wind load situations, such as in response to second wind forces 92 or 92*a* exerted on the sign in a direction generally parallel to the normal sign orientation as shown in FIG. 10, the frame 12*a* shown in FIG. 7, and the alternate frame 12*a* and 12*c*, shown in FIGS. 8 and 9, and discussed below, include means for allowing the sign panel to pivot or swing laterally about a generally vertical axis. Such capability allows the pivoted sign to assume sign orientations such as those illustrated by reference numerals 81 and 82 in FIG. 10, which in turn allow the stand to pivot and deflect along the above-mentioned predetermined plane as is more fully explained below.

In the embodiment of the invention illustrated in FIG. 7, the capability of allowing the sign panel of sign 12*a* to pivot or swing laterally is provided by the above-discussed unsecured portion of the cross-brace 13. Such unsecured portion is sufficiently long and sufficiently flexible to torsionally twist about a generally vertical axis in response to the side-directed second wind forces 92 or 92*a*, for example. Such torsional twisting thus permits the sign panel to pivot laterally as shown in FIG. 10. When the sign panel pivots or twists laterally about said generally vertical axis to a transverse orientation relative to such side-directed winds, the second wind forces, such as 92 or 92*a*, have a force vector component exerted in a sufficiently transverse direction against the sign panel such that the coil springs may resiliently deflect the frame along the above-discussed predetermined plane, as shown in FIG. 11. The length and flexibility of the unsecured portion of the cross-brace 13 should be sufficient to allow enough torsional twisting of the cross-brace to permit the sign panel to laterally pivot far enough to cause the coil springs to deflect along such predetermined plane before the sign and stand assembly can tip over under the load of the second wind forces. Additionally, if the optional flag holder 20 and flags 18 are to be included, at least the cross-brace 13 should be sufficiently rigid to support the flag holder and flags, but sufficiently flexible to allow such torsional twisting.

As mentioned above, the exact range of lateral pivotal or swinging motion of the sign depends upon many factors such as sign size, height and weight and coil spring constants, for example. However, a range of lateral pivotal movement through a total arc 96 in FIG. 10 of approximately 10–35 degrees, and most preferably approximately 15 degrees swing to either side of the normal sign orientation 80, has been found to provide satisfactory results. Either smaller or larger ranges of such pivotal sign movement may also be found to be sufficient or necessary in order to provide satisfactory results, depending upon the particular physical constraints present and the particular application of the principles of the invention. It should be realized, however, that such pivotal or swinging movement should not be significantly greater than that necessary to allow deflection of the frame along the above-mentioned predetermined plane in order to prevent the sign from becoming oriented so far askew to oncoming traffic that it cannot be read and observed by such traffic.

Referring to FIG. 8, another embodiment of the present invention includes a stand frame 12*b* generally similar to the stand frame 12*a* shown in FIG. 7, with the exceptions described below. As an alternative for the torsional twisting of the unsecured portion of the cross-brace 13, it is also possible to allow the cross-brace to pivot or swing freely inside the channels 164*b*, i.e. without any frictional engagement. In this embodiment, as shown in FIG. 8, the channels 164*b* are made sufficiently large to allow the vertical cross-brace 13 to slide easily into the channels without contacting the leg portions 166*b* in order to permit sufficient lateral pivoting of the cross-brace upon application of side-directed wind forces such as 92 and 92*a*, for example. The width and thickness of the cross-brace, and accordingly the size of the channels 164*b*, depend upon such factors as the material from which the cross-brace is composed and whether or not the flag holder 20 and flags 18 are to be supported by the cross-brace, as discussed above, as well as other factors that will be readily identified by one skilled in the art upon an examination of the disclosures herein. In order to prevent the sign from slipping out of the channel when the frame 12 is deflected (as shown in FIG. 10), the hitch pin 153*b* is inserted through the aperture 158*b* in the cross-brace 13 and through the corresponding aperture 159*b* in the frame 12*b*. Similar to the embodiment shown in FIG. 7 above, two channels 164*b* are preferably provided on opposite sides of the frame 12*b* so that the cross-brace 13 can be inserted in the properly-oriented side (facing the traffic) once the stand is set-up in place.

As discussed above, the hitch pin 153*b* has a spring-loaded detent means 159*b*, which comprises a spring-loaded ball or sphere resiliently attached to the free end of the hitch pin. This detent means prevents the hitch pin from falling or slipping out of the apertures 158*b* and 157*b* after it is inserted in place. Thus, in order to insert and remove the hitch pin 153*b*, a force must be applied in the pin's axial direction. A chain 155*b* is attached to the other end of the hitch pin and is in turn attached to the frame 12*b* in order to prevent the hitch pin from being lost or misplaced.

Referring to FIG. 9, still another alternate preferred embodiment of the invention includes a stand frame 12*c*. In this embodiment, the means for allowing lateral pivotal or swing sign movement is provided by channels 164*c* formed by the channel legs 166*c* and the interconnecting channel bases 168*c*, which have generally arcuate frame-engaging surfaces 170. The spaces between the channel legs 166*c* are sufficiently wider than the thickness of the cross-brace 13 to allow the cross-brace to pivot or swing, as discussed above, about a generally vertical axis as illustrated in FIGS. 10 and 11. As is shown in FIG. 9, however, the corner edges of the cross-brace 13 frictionally engage the arcuate surfaces 170 of the channels 164*c* to frictionally retain the cross-brace 13 and thus the sign 10*c* in an attached relationship with the frame 12*c*. Thus, the sign 10*c* may be attached to the frame 12c merely by slidably and frictionally inserting the vertical cross-brace 13 into the channels 164c on either of the opposite sides of the frame 12c such that the cross-brace 13 is frictionally retained therein. Such frictional engagement of the cross-brace 13 and the channel 164c is maintained even when the sign 10c pivots laterally about the above-mentioned vertical axis. The hitch pin 153c, with its detent means 199c and chain 155c as discussed above, may also be employed in FIG. 9 in connection with the apertures 157c and 158c, if deemed desirable or advantageous in order to assure retention of the sign. It should be noted that the width and thickness of the cross-brace, and accordingly the size of the channels 164c, depend upon such factors as the material from which the cross-brace is composed and whether or not the flag holder 20 and flags 18 are to be supported by the cross-brace, as discussed above, as well as other factors that will be readily identified by one skilled in the art upon an examination of the disclosures herein.

When the sign panel pivots or swings laterally about said generally vertical axis to a transverse orientation relative to side-directed winds, as discussed above in connection with the embodiment of FIG. 7, the second wind forces, such as 92 and 92a, have a force vector component exerted in a sufficiently transverse direction against the sign such that the coil springs 16 may resiliently deflect the frames 12b and 12c along the above-described predetermined plane, as shown in FIG. 10. The width of the channels 164b and 164c, the distance between the channel bases 168b and 168c, and the spring constants of the coil spring and other parameters are selected such that sufficient lateral pivotal movement of the sign occurs to cause or allow the resultant deflection of the frame member to occur before the sign and stand assembly can tip over under the load of the second wind forces.

As was discussed above, the exact range of pivotal movement of the sign depends upon several factors such as sign size and weight and coil spring constants, for example. However, a range of pivotal sign movement through a total arc 96 (shown in FIG. 10) of approximately 10-35 degrees, and preferably approximately 15 degrees on either side of the normal sign orientation 80, has been found to provide satisfactory results. Either smaller or larger ranges of pivotal movement may also be sufficient to cause or allow the desired frame deflection, depending upon the particular physical conditions present and the particular application of the principles of the invention. It should be noted, however, that the arcuate surfaces 170 in FIG. 9 preferably both fall upon an imaginary circle 172 (shown in FIG. 9) which has a center located generally midway between the arcuate surfaces 170 and generally midway between the channel legs 166c. Such a configuration provides for the desired frictional engagement of the cross-brace 13 with the arcuate surfaces 170 while still allowing the requisite pivotal movement.

As shown and described above, the embodiments of the present invention shown in FIGS. 6 through 9 provide a sign stand having the capability of simple, quick and easy attachment and removal of signs on the sign frame. These embodiments also provide a sign attachment means that functions to minimize the possibility of the sign and stand assembly tipping over or sliding to undesired locations in high winds, no matter in which direction the forces of such winds are exerted.

The various parts of the sign and stand assembly embodiments of FIGS. 6 through 9 are preferably made of aluminum, but may also be made of any other lightweight materials that are strong enough to withstand the forces to which such signs are normally exposed in use. Furthermore, even though these embodiments described above are being used for flexible or roll-up signs of diamond shapes, it is apparent that they may be employed with a wide variety of signs of different materials, rigid or soft and with signs of widely varying sizes and shapes. With rigid signs, however, a flange or protruding member at least functionally similar to the vertical cross-brace 13 should be provided and should be adapted to be inserted as discussed above within the channels 164a, 164b or 164c on either of the opposite sides of the frames 12a, 12b or 12c, respectively. In the embodiment of FIG. 7, however, such a flange or protruding member should have sufficient resilience and flexiblity to allow the above-described torsional twisting of its unsecured portion. Also, in order to retain the compactness and relatively small size of these embodiments of the invention for storage and transportation, the rigid signs should also be collapsible or foldable.

The foregoing discussion discloses and describes merely exemplary embodiments of the present invention. One skilled in the art will readily recognize from such discussion that various changes, modifications and variations may be made therein without departing from the spirit and scope of the invention as defined in the following claims.

What is claimed is:

1. In a sign and sign stand assembly, said sign having at least one generally horizontal cross-brace thereon, said sign stand including a frame member, frame deflection means for resiliently deflecting said frame member downwardly generally along a predetermined plane in response to first wind forces exerted generally transverse to the plane of said sign, the improvement comprising a pair of upwardly-presenting channel members secured to said frame member for receiving said horizontal cross-brace therein; each of said channel members having an inner leg spaced apart from an outer leg, the spaces between said legs being sufficiently wide to allow said cross-brace to pivotally swing therebetween, a pair of latching members pivotal relative to said frame member, resilient means for biasing said latching members toward abutting engagement with said horizontal cross-brace to biasingly urge cross-brace against said outer leg, said resilient means yieldably allowing said cross-brace and said sign to pivotally swing about a generally vertical axis in response to second wind forces exerted generally parallel to the plane of said sign, said pivoted sign being oriented generally transverse to said second wind forces in order to allow said frame member to deflect generally along said predetermined plane, said assembly further comprising a generally vertical cross-brace on said sign, and warning device supporting means for supporting a warning device thereon, said vertical cross-brace being adapted to support said warning device supporting means and said warning device thereon.

2. The improvement according to claim 1, wherein said warning device comprises at least one warning flag.

3. The improvement according to claim 1, wherein a portion of at least one of said latching members at least partially circumscribe said horizontal cross-brace in order to retain said sign on said frame member during said pivotal movement of said cross-brace and sign.

4. The improvement according to claim 3, wherein said sign is permitted to pivot through a total arc of approximately 10 degrees to approximately 35 degrees.

5. The improvement according to claim 4, wherein said sign is permitted to pivot through an arc of approximately 15 degrees on each side of the normal orientation of said sign, said normal orientation being generally perpendicular to said predetermined plane.

6. The improvement according to claim 1, wherein said warning device supporting means includes a warning flag holder having a first horizontal portion, a second horizontal portion vertically spaced from said first horizontal portion, and a lower portion generally downwardly depending from said second horizontal portion, said first and second horizontal portions each having at least one opening extending therethrough, said warning device including a warning flag having a pole portion releasably insertable through said openings in said first and second horizontal portions and abuttable with said lower portion, said warning flag thereby being adapted to be releasably attached to and supported by said flag holder.

* * * * *

UNITED STATES PATENT AND TRADEMARK OFFICE
CERTIFICATE OF CORRECTION

PATENT NO. : 4,575,040

DATED : March 11, 1986

INVENTOR(S) : James R. Seely

It is certified that error appears in the above-identified patent and that said Letters Patent is hereby corrected as shown below:

| | |
|---|---|
| Column 1, line 45 | "to" should be --or--. |
| Column 2, line 40 | delete "and" |
| Column 3, line 10 | Delete "," after --flags--. |
| Column 4, line 15 | "flage" should be --flag--. |
| Column 4, line 62 | "cross-brace" should be --cross-braces--. |
| Column 8, line 5 | "approxmately" should be --approximately--. |
| Column 8, line 35 | Insert "sign" after --upright--. |
| Column 9, line 12 | Insert "with" after --accordance--. |
| Column 11, line 22 | "12a" should be --12b--. |

Signed and Sealed this

Ninth Day of December, 1986

*Attest:*

DONALD J. QUIGG

*Attesting Officer* *Commissioner of Patents and Trademarks*